US009505046B2

(12) United States Patent
Tanaka et al.

(10) Patent No.: US 9,505,046 B2
(45) Date of Patent: Nov. 29, 2016

(54) FLAT WIRING MEMBER AND METHOD OF MANUFACTURING THE SAME

(71) Applicant: Hitachi Metals, Ltd., Tokyo (JP)

(72) Inventors: Kotaro Tanaka, Naka-gun (JP); Toshiyuki Horikoshi, Mito (JP); Takumi Sato, Hitachi (JP); Kenichi Murakami, Hitachi (JP); Yasuhiro Funayama, Naka-gun (JP); Asuka Okamoto, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/177,252

(22) Filed: Feb. 11, 2014

(65) Prior Publication Data

US 2014/0332267 A1 Nov. 13, 2014

(30) Foreign Application Priority Data

May 10, 2013 (JP) ................................ 2013-099896

(51) Int. Cl.

| | |
|---|---|
| ***H02G 15/18*** | (2006.01) |
| ***B21C 37/15*** | (2006.01) |
| ***H01B 13/012*** | (2006.01) |
| *B21D 7/022* | (2006.01) |
| *H01B 13/00* | (2006.01) |

(52) U.S. Cl.
CPC ....... *B21C 37/155* (2013.01); *H01B 13/01254* (2013.01); *B21D 7/022* (2013.01); *H01B 13/0023* (2013.01)

(58) Field of Classification Search
CPC ........ H01B 7/0823; H02G 3/02; B21D 7/14; B21C 37/155
USPC ..................... 174/71 R, 72 A, 117 FF, 117 F
See application file for complete search history.

(56) References Cited

U.S. PATENT DOCUMENTS

| | | | | | |
|---|---|---|---|---|---|
| 2,425,294 | A | * | 8/1947 | Morgan | 310/208 |
| 2,628,998 | A | * | 2/1953 | Frisbie | 174/112 |
| 3,513,252 | A | * | 5/1970 | Schoerner | C22C 21/00 148/437 |
| 3,528,852 | A | * | 9/1970 | Arndt et al. | 428/383 |
| 3,733,428 | A | * | 5/1973 | Fry | 174/72 A |
| 4,353,372 | A | * | 10/1982 | Ayer | 600/393 |
| 4,467,138 | A | * | 8/1984 | Brorein | G02B 6/4403 174/115 |

(Continued)

FOREIGN PATENT DOCUMENTS

| | | | |
|---|---|---|---|
| CN | 2755737 | Y | 2/2006 |
| JP | 06-181007 | A | 6/1994 |

(Continued)

OTHER PUBLICATIONS

English translation of JP H06-181007, 1994.*

(Continued)

*Primary Examiner* — Steven T Sawyer
(74) *Attorney, Agent, or Firm* — Roberts Mlotkowski Safran Cole & Calderon, PC

(57) ABSTRACT

A flat wiring member includes a plurality of rectangular enamel coated wires arranged in the form of a flat plate, a wiring stem portion that the rectangular enamel coated wires are arranged in parallel to each other and adjacent ones of the rectangular enamel coated wires are bonded to each other at a surface of an enamel coat layer thereof, and a wiring branch portion with the rectangular enamel coated wires bent so as to branch off from the wiring stem portion.

2 Claims, 5 Drawing Sheets

(56) References Cited

U.S. PATENT DOCUMENTS

| | | | | |
|---|---|---|---|---|
| 4,874,908 | A * | 10/1989 | Johansson | 174/72 A |
| 5,304,741 | A * | 4/1994 | Proulx | H01B 7/0823 174/110 FC |
| 5,483,021 | A * | 1/1996 | Saen | H05K 3/244 174/117 FF |
| 6,630,625 | B1 | 10/2003 | Akashi et al. | |
| 2001/0011603 | A1* | 8/2001 | Ueno | 174/117 FF |
| 2002/0076953 | A1* | 6/2002 | Terai | H05K 1/118 439/67 |
| 2007/0068698 | A1* | 3/2007 | Suekuni | H01R 12/592 174/117 F |
| 2009/0082655 | A1* | 3/2009 | Seifert | A61N 1/05 600/373 |

FOREIGN PATENT DOCUMENTS

| | | |
|---|---|---|
| JP | 2002-157924 | 5/2002 |
| JP | 2002-203431 | 7/2002 |
| JP | 2009-104889 | 5/2009 |

OTHER PUBLICATIONS

Japanese Office Action for corresponding Japanese Patent Application No. 2013-099896 dated May 31, 2016 and English translation thereof.

Chinese Office Action for corresponding Chinese Patent Application No. 201410041384.1 dated Jun. 27, 2016 and English translation thereof.

* cited by examiner

FIG. 2A
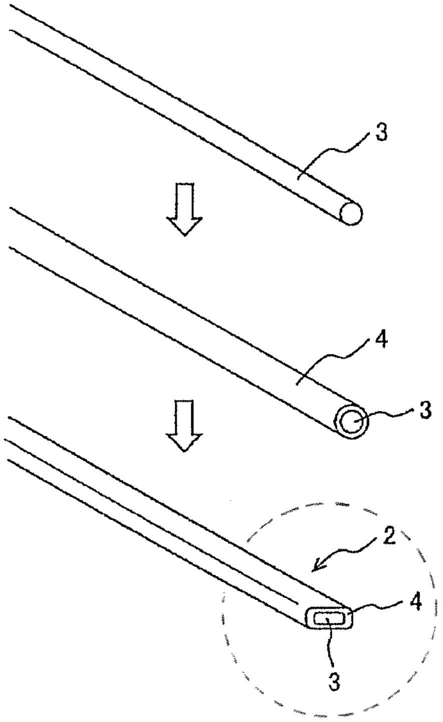
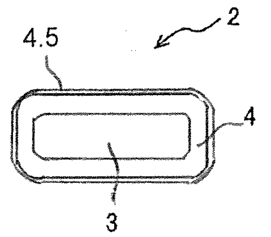
FIG. 2B
FIG.3
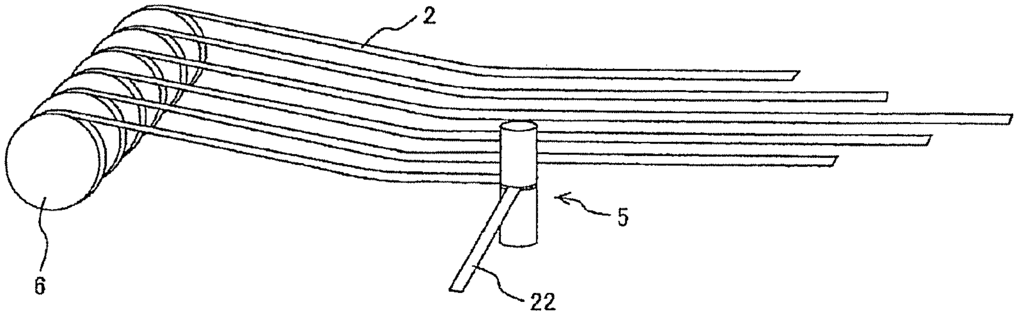

FLAT WIRING MEMBER AND METHOD OF MANUFACTURING THE SAME

The present application is based on Japanese patent application No. 2013-099896 filed on May 10, 2013, the entire contents of which are incorporated herein by reference.

BACKGROUND OF THE INVENTION

1. Field of the Invention

The invention relates to a flat wiring member (or a flat wire harness or a flat harness) and, in particular, to a flat wiring member that is used for controlling a secondary battery module and is advantageous for increasing length and reducing the cost, as well as a method of manufacturing the flat wiring member.

2. Description of the Related Art

In recent years, secondary batteries typified by lithium-ion batteries and nickel-hydrogen batteries have been used more widely from portable electronic devices (e.g., mobile personal computers or cell-phones) to large electrical equipments (e.g., power sources for vehicles such as HEV (hybrid vehicle) or EV (electric vehicle), power storage sources, uninterruptible power-supply systems of data centers, etc., and electric-load leveling systems for natural energy of sun or wind, etc.).

When used in large electrical equipments, secondary batteries are required to have much higher output and capacity than in portable electronic devices. Thus, it is necessary to increase capacity of each secondary battery as a single cell (hereinafter, sometimes referred to as "cell") as well as to combine plural batteries.

When using secondary batteries in a large electrical equipment, a secondary battery module is generally formed by coupling plural cells using connecting members such as bus bars. In case of a secondary battery module in which cells are connected in series, variation in battery characteristics among the cells, if any, causes restriction of battery characteristics or reliability of the entire secondary module because of the cell having the poorest battery characteristics. Therefore, it is important to suppress variation in battery characteristics among the cells.

In addition, when secondary batteries (especially, lithium-ion secondary batteries) are in an overcharged state or in an over-discharged state, battery performance significantly deteriorate or battery life is extremely shortened. Thus, when charging or discharging, highly accurate voltage control (e.g., at several tens of mV) is required to prevent overcharge or over-discharge. For controlling voltage, an electrode of each cell is connected to a control circuit or a protection circuit via a monitor wiring member.

In conventional secondary batteries for portable electronic devices, flexible printed circuit (FPC) boards, etc., having a predetermined wiring formed thereon are preferably used as a monitor wiring member for space saving and easy assembly (also for prevention of miswiring). On the other hand, in secondary battery modules for large electrical equipments, capacity of each cell and the number of cells are increased as described above. Accordingly, the number of wirings on the monitor wiring member needs to be increased and each wiring becomes much longer (e.g., about 0.5 to 1 m in length) than that in portable electronic devices.

In general, for manufacturing a FPC, a copper-clad laminate having a thin copper foil laminated on a flexible resin base material (e.g., a polyimide film) is used and the copper foil is patterned (e.g., by photolithography and etching).

After the patterning, an excess portion of the flexible resin base material of the copper-clad laminate is often removed by punching or cutting.

Here, there is a problem when using a FPC as a monitor wiring member of secondary battery module for large electrical equipment since existing photolithography equipments are intended to handle the size up to about 12 inches and thus cannot directly process the size of such FPC (e.g., about 0.5 to 1 m). In addition, the FPC also has a problem that an increase in wiring length causes an increase in wiring resistance since the copper foil (i.e., the wiring) is very thin (e.g., about several tens of .mu.m). Note that, increasing width of each wiring in order to suppress such an increase in wiring resistance is to run counter to space saving of monitor wiring member and is not a realistic solution in view of size restriction caused by the photolithography equipments.

Various flat harnesses have been proposed to solve such problems. For example, JP-A-2002-157924 discloses a flat harness provided with a lower insulating film having an adhesive layer on an upper surface, conductive wires laid along a predetermined wiring pattern on the upper surface of the lower insulating film and an upper insulating film covering the upper surface of the lower insulating film having the conductive wires laid thereon, wherein the conductive wires are plural solid wires laid on the same surface and the plural solid wires are arranged in tight contact with each other on the upper surface of the lower insulating film so that adjacent solid wires are in parallel. According to JP-A-2002-157924, by using a solid wire as a conductor and shaping/wiring the solid wires along a predetermined wiring pattern, it is possible to provide a flat harness which realizes a thinner shape, larger current capacity and lower manufacturing cost than that using a twisted wire as a conductive wire.

Meanwhile, JP-A-2002-203431 discloses a flat harness provided with a first flat cable and a second flat cable connected to a middle portion of the first flat cable at a connecting portion and used for lower current than the first flat cable, wherein at least some conductors of the first flat cable are electrically connected to at least some conductors of the second flat cable. According to JP-A-2002-203431, since the first flat cable (flexible flat cable or ribbon cable, etc.) having a large conductor cross sectional area and suitable for high current is used for connection to a high-current circuit and the second flat cable (FPC, etc.) suitable for low current is used for connection to a low-current circuit, an increase in wiring width for suppressing an increase in wiring resistance is not required and it is thus possible to reduce the overall width of the flat harness as compared to that using FPC for all wiring portions.

In addition, JP-A-2009-104889 discloses a vehicle wire harness which is arranged in a vehicle and in which plural enamel wires bundled together are hardened in a state of being firmly fixed to each other by an adhesive or a bonding material formed of an insulating resin and the plural enamel wires in the hardened state have a two-dimensional shape or/and a three-dimensional shape corresponding to the layout in the vehicle. According to JP-A-2009-104889, since a conductor formed of a single-core wire is used and an insulation layer of the enamel wire is thin, it is possible to reduce diameter and weight of the wire harness.

SUMMARY OF THE INVENTION

Recently there is a strong demand for the cost reduction of electrical equipment, and there is also a strong demand for cost reduction of each member constituting the electrical equipment while maintaining the performance and quality.

It is considered that, in the flat harness disclosed in JP-A-2002-157924, an increase in wiring resistance can be suppressed since a larger conductor cross sectional area than the copper foil of the FPC is provided by using plural solid wires each having a round cross section. However, since the conductive wires each formed of a solid wire are laid one by one on the upper surface of the lower insulating film so as to have a predetermined shape, it is disadvantageous in that the manufacturing cost increases with an increase in the number of wirings. In addition, since plural conductive wires each formed of a solid wire are cover all together with the lower and upper insulating films, it is difficult to branch off the conductor wires from a give position of the flat harness.

The flat harness disclosed in JP-A-2002-203431 is advantageous in that the conductive wires can be branched off from a given position but it is disadvantageous in terms of the manufacturing cost because a step of joining the first and second flat cables is essentially required. In addition, since the joint is located at the middle of the flat harness, it may be disadvantageous in terms of long-time reliability including weather resistance.

The wire harness disclosed in JP-A-2009-104889 is advantageous in that the enamel wires can be branched off from a given position and it is not necessary to provide a joint. Here, when round enamel wires are bundled in a flat manner, it is considered disadvantageous in that the bundle of the enamel wires is likely to be separated due to external loads such as vibration since a joining area between adjacent enamel wires is small. Thus, in order to overcome such a disadvantage, the round enamel wires in JP-A-2009-104889 are very densely arranged in a honeycomb pattern to provide a sufficient joining area between the adjacent enamel wires. However, a resulting increase in thickness of the wire harness cannot be avoided and it is thus disadvantageous in that it is difficult to arrange in a narrow space (especially, in a thin gap).

It is an object of the invention to provide a flat wiring member that is thin but prevents an increase in wiring resistance due to a sufficient conductor cross sectional area, allows the branching of individual wires from any positions of a flat wire harness and allows the cost reduction of the flat wire harness, as well as a method of manufacturing the flat wiring member.

(1) According to one embodiment of the invention, a flat wiring member comprises:

a plurality of rectangular enamel coated wires arranged in the form of a flat plate;

a wiring stem portion that the rectangular enamel coated wires are arranged in parallel to each other and adjacent ones of the rectangular enamel coated wires are bonded to each other at an edge surface of an enamel coat layer thereof; and a wiring branch portion that the rectangular enamel coated wires are bent so as to branch off from the wiring stem portion.

Herein, a rectangular enamel coated wire is defined as an insulated wire including: a conductor that includes at least a pair of opposite flat surfaces, and in a front view a conductor width being larger than a conductor thickness (e.g., a cross sectional shape of the conductor being a rectangular shape, a rounded-corner rectangular shape and a racetrack shape); and an enamel coat layer formed on an outer periphery of the conductor. An edge surface of the rectangular enamel coated wire is defined as a surface where the conductor thickness is viewed.

In the above embodiment (1) of the invention, the following modifications and changes can be made.

(i) The bonding of the adjacent rectangular enamel coated wires at the wiring stem portion is made through a fusing of a self-fusing layer formed on a surface of the enamel coat layer.

(ii) The wiring branch portion is formed by edgewise bending the rectangular enamel coated wires.

(iii) A connector terminal is formed at a terminal portion of the wiring stem portion.

(2) According to another embodiment of the invention, a method of manufacturing the flat wiring member according to the embodiment (1) comprises:

providing the rectangular enamel coated wires;

forming the wiring branch portion by bending the rectangular enamel coated wires at a predetermined position; and forming the wiring stem portion such that the rectangular enamel coated wires with the wiring branch portion formed therein are arranged in parallel except the wiring branch portion and bonded to each other.

In the above embodiment (2) of the invention, the following modifications and changes can be made.

(iv) The providing of the rectangular enamel coated wires comprises providing round enamel coated wires and forming the rectangular enamel coated wires by rolling the round enamel coated wires.

(v) The providing of the rectangular enamel coated wires comprises forming a self-fusing layer on a surface of the enamel coat layer.

(vi) The forming of the wiring branch portion comprises edgewise bending the rectangular enamel coated wires.

Effects of the Invention

According to one embodiment of the invention, a flat wiring member can be provided that is thin but prevents an increase in wiring resistance due to a sufficient conductor cross sectional area, allows the branching of individual wires from any positions of a flat wire harness and allows the cost reduction of the flat wire harness, as well as a method of manufacturing the flat wiring member.

BRIEF DESCRIPTION OF THE DRAWINGS

Next, the present invention will be explained in more detail in conjunction with appended drawings, wherein:

FIG. 1A is a front view of the entire flat wiring member 1, FIG. 1B is a cross sectional view of a terminal portion 21*a* of a wiring stem portion 21, FIG. 1C is a cross sectional view of the wiring stem portion 21, and FIG. 1D is a perspective view of the terminal portion 21*a* of the wiring stem portion 21;

FIG. 2A is a schematic perspective view roughly showing a step of providing rectangular enamel coated wire, while FIG. 2B is an enlarged end-view of the rectangular enamel coated wire illustrated in FIG. 2A;

FIG. 3 is a schematic perspective view showing a state when wiring branch portions are formed by bending the rectangular enamel coated wires;

DETAILED DESCRIPTION OF THE PREFERRED EMBODIMENTS

Figure 1A:
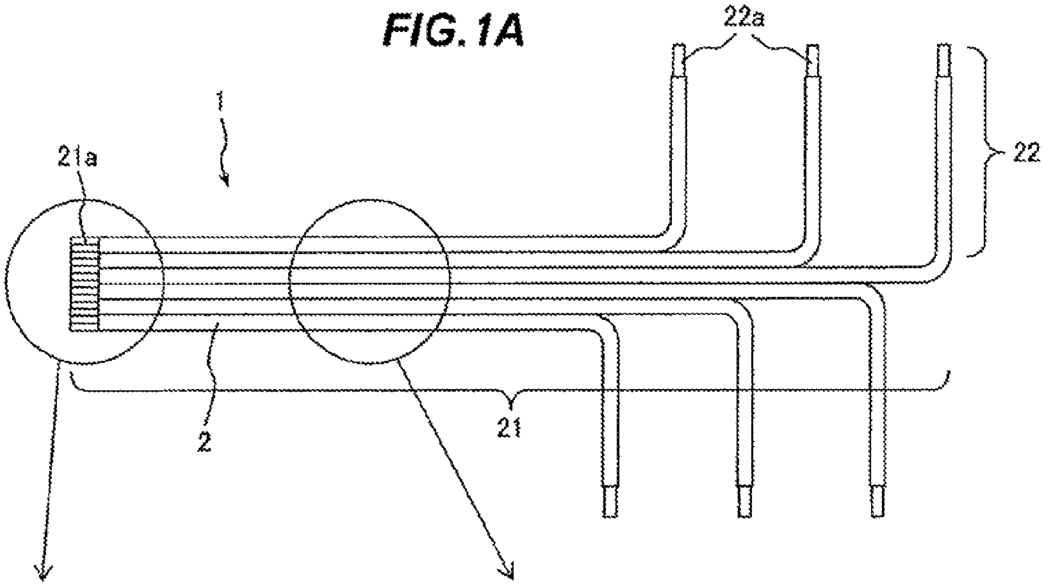
FIGS. 1A to 1D are schematic views showing an example of a flat wiring member in an embodiment of the present invention, where

Embodiments of the invention will be described below in reference to the drawings. However, the invention is not intended to be limited to the embodiments and appropriate combinations and modifications can be implemented without departing from the technical idea of the invention. In addition, members/portions having substantially the same functions are denoted by the same reference numerals and the overlapped explanation thereof will be omitted.

First Embodiment

Flat Wiring Member

Figure 1B:
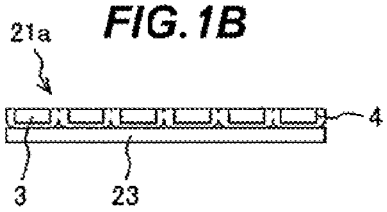
Figure 1C:
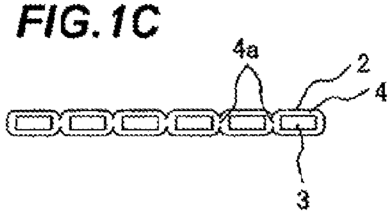
Figure 1D:
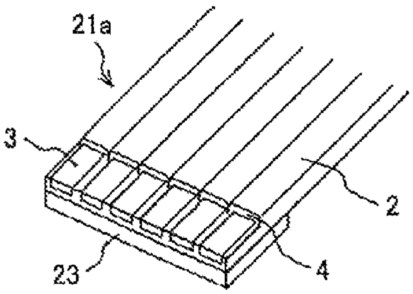

FIGS. 1A to 1D are schematic views showing an example of a flat wiring member in an embodiment of the invention. In detail, FIG. 1A is a front view of the entire flat wiring member 1, FIG. 1B is a cross sectional view of a terminal portion 21*a* of a wiring stem portion 21, FIG. 1C is a cross sectional view of the wiring stem portion 21, and FIG. 1D is a perspective view of the terminal portion 21*a* of the wiring stem portion 21.

As shown in FIGS. 1A to 1D, the flat wiring member 1 in the invention is formed by arranging plural rectangular enamel coated wires 2 in the form of a flat plate and has the wiring stem portion 21 and wiring branch portions 22. The wiring stem portion 21 is composed of the plural rectangular enamel coated wires 2 aligned in parallel to each other in which edge surfaces 4*a* of enamel coat layers 4 of the adjacent rectangular enamel coated wires 2 are adhered to each other, and each wiring branch portion 22 is formed by bending the rectangular enamel coated wire 2 so as to branch off from the wiring stem portion 21 (see the front view of the entire flat wiring member 1 and the cross sectional view of the wiring stem portion 21). The rectangular enamel coated wire 2 is preferably bent edgewise from the viewpoint of thickness reduction and flexibility of the flat wiring member 1.

The terminal portion 21*a* of the wiring stem portion 21 has a structure in which the enamel coat layers 4 of the rectangular enamel coated wires 2 are partially removed and conductors 3 of the rectangular enamel coated wires 2 are exposed in an array row (see the cross sectional view of the terminal portion 21*a* of the wiring stem portion 21 and the perspective view of the terminal portion 21*a* of the wiring stem portion 21). The terminal portion 21*a* of the wiring stem portion 21 is connected to a control circuit or a protection circuit of a secondary battery module.

A reinforcing plate 23 may be attached on the opposite side to the conductors 3 exposed in an array row. This forms a connector terminal which is connectable to a conventional FFC connector.

Meanwhile, terminal portions 22*a* of the wiring branch portions 22 are respectively connected to electrodes of cells constituting the secondary battery module. The terminal portion 22*a* of the wiring branch portion 22 also has a structure in which the enamel coat layer 4 of the rectangular enamel coated wire 2 is partially removed and the conductor 3 of the rectangular enamel coated wire 2 is exposed.

The structure of the terminal portion 21*a* of the wiring stem portion 21 and the structure of the terminal portion 22*a* of the wiring branch portion 22 depend on a connection method and are not limited to the structure mentioned above. In case of connecting by, e.g., a fusing method (a method in which the enamel coat layer 4 is melted and the conductor 3 is simultaneously joined to another member), it is not necessary to preliminarily remove the enamel coat layer 4.

Although, in FIGS. 1A to 1D, it is shown that the wiring branch portions 22 are branched at equal intervals so as to have the same length and are bent to have the same angle (the angle formed between the wiring stem portion 21 and the wiring branch portion 22), the invention is not limited thereto. In other words, the wiring branch portions 22 may have any interval (branched off from any positions of the wiring stem portion 21), may have any lengths and may be bent to have any angles.

In the invention, the rectangular enamel coated wire 2 is not particularly limited and it is possible to use a conventional enamel coated wire. As a material of the conductor 3, it is possible to use, e.g., oxygen-free copper, tough pitch copper, copper alloy and aluminum, etc. As a material of the enamel coat layer 4, it is possible to use polyimide, polyamide and polyester-imide, etc.

In addition, the rectangular enamel coated wire 2 preferably has a self-fusing layer 4.5 (shown in FIG. 2B) provided on the surface of the enamel coat layer 4 (i.e., provided as the outermost layer). This allows a formation process of the wiring stem portion 21 (a step of adhering the enamel coat layers to each other) to be simplified (i.e., allows cost reduction).

The enamel coated wire used in the invention is preferably a rectangular enamel coated wire from the viewpoint of thickness reduction of the flat wiring member 1. Thickness can be reduced by using the rectangular enamel coated wire as compared to a round enamel coated wire having the same conductor cross sectional area. Furthermore, the rectangular enamel coated wire allows a sufficient joining area between adjacent enamel wires (i.e., sufficient joint strength) to be provided as compared to the round enamel coated wire. In other words, it is not necessary to employ a laminated structure to provide a sufficient joining area/joint strength.

Method of Manufacturing the Flat Wiring Member

As described above, a method of manufacturing a flat wiring member in the invention includes a step of providing the rectangular enamel coated wire, a step of forming the wiring branch portion by bending the rectangular enamel coated wire at a predetermined position, and a step of forming the wiring stem portion in which portions of the bent rectangular enamel coated wires other than the wiring branch portions are arranged in parallel and are adhered to each other. Each step will be described in more detail below.

(1) Step of Providing the Rectangular Enamel Coated Wire

FIG. 2A is a schematic perspective view roughly showing a step of providing a rectangular enamel coated wire. As shown in FIG. 2A, the conductor 3 having a circular cross section is provided and the enamel coat layer 4 is then formed on an outer peripheral surface of the conductor 3. The enamel coat layer 4 is generally formed by applying and baking an insulating coating material but may be formed by extruding an insulating coating material. Then, the conductor 3 having the enamel coat layer 4 on the surface thereof (i.e., a round enamel coated wire) is rolled and the rectangular enamel coated wire 2 is thereby obtained. As shown in FIG. 2B, a self-fusing layer 4.5 is provided over the enamel coat layer 4.

It should be noted that the procedure in the invention is not limited to that mentioned above as long as the rectangular enamel coated wire 2 is obtained eventually. The enamel coat layer 4 may be formed on an outer peripheral surface of the conductor 3 having, e.g., a rounded-corner rectangular cross section. The manufactured rectangular enamel coated wire 2 is preferably taken up on a reel, etc.

(2) Step of Forming the Wiring Branch Portion

FIG. 3 is a schematic perspective view showing a state when wiring branch portions are formed by bending the rectangular enamel coated wires. As shown in FIG. 3, the rectangular enamel coated wires 2 provided in the previous step are pulled out from a reel 6 and are bent at predetermined positions using a bending apparatus 5, thereby forming the wiring branch portions 22. The predetermined position here means a position providing a predetermined length of the wiring branch portion 22. In addition, the rectangular enamel coated wire 2 is preferably bent edgewise from the viewpoint of thickness reduction and flexibility of the flat wiring member 1, as described above.

Note that, although plural rectangular enamel coated wires 2 are pulled out from the reel 6 in FIG. 3 for the purpose of making clear the whole picture of the flat wiring member, the invention is not limited thereto. The sequential bending process may be performed on one rectangular enamel coated wire 2. In addition, the plural rectangular enamel coated wires 2 do not need to be all the same. The rectangular enamel coated wires 2 having the conductors 3 formed of different materials or rectangular enamel coated wires having different widths may be mixed. However, it is preferable to use rectangular enamel coated wires having the same thickness from the viewpoint of stable flexibility of the flat wiring member.

Figure 4A:
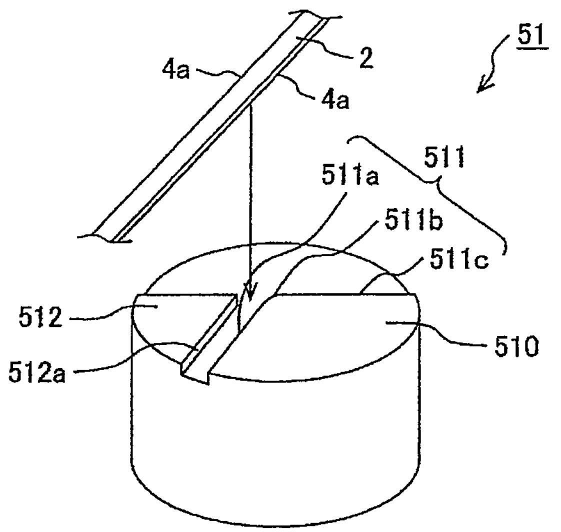
FIGS. 4A to 4C are schematic perspective views showing an example of a bending apparatus.
Figure 4B:
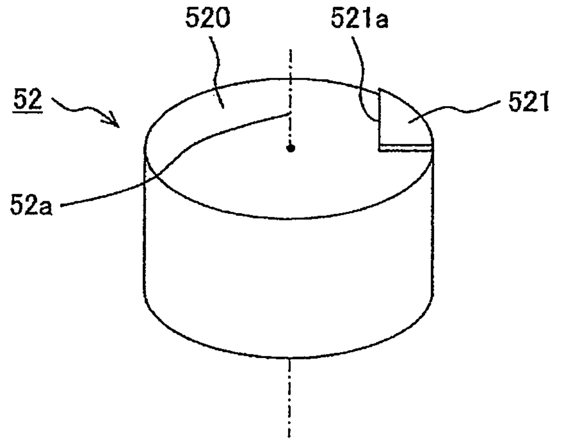
Figure 4C:
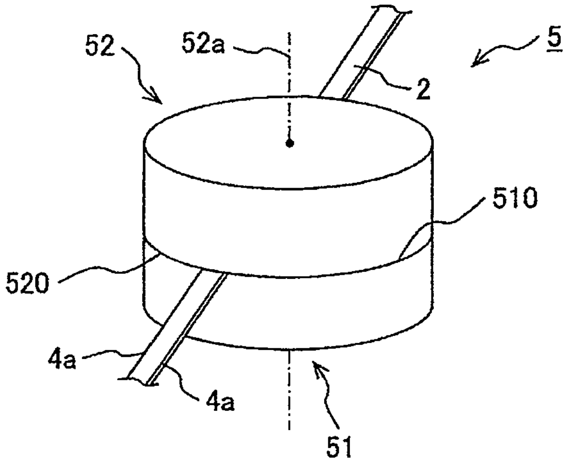

Next, edgewise bending of the rectangular enamel coated wire 2 using the bending apparatus 5 will be described. FIGS. 4A to 4C are schematic perspective views showing an example of a bending apparatus. FIG. 4A shows a first holding jig of the bending apparatus and a rectangular enamel coated wire, FIG. 4B shows a second holding jig of the bending apparatus and FIG. 4C shows a state in which the first and second holding jigs are combined with the rectangular enamel coated wire interposed therebetween.

Figure 5A:
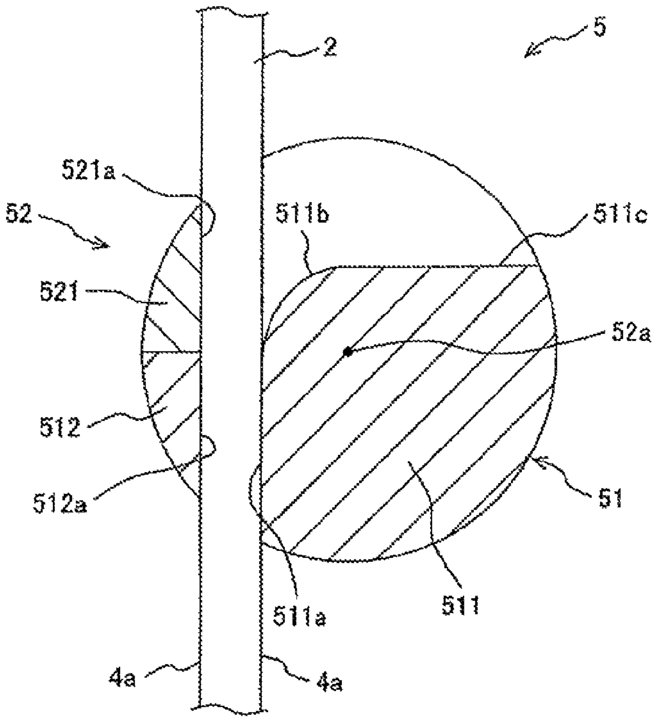
FIGS. 5A and 5B are schematic cross sectional views showing a state during an edgewise bending process of the rectangular enamel coated wire using the bending apparatus.
Figure 5B:
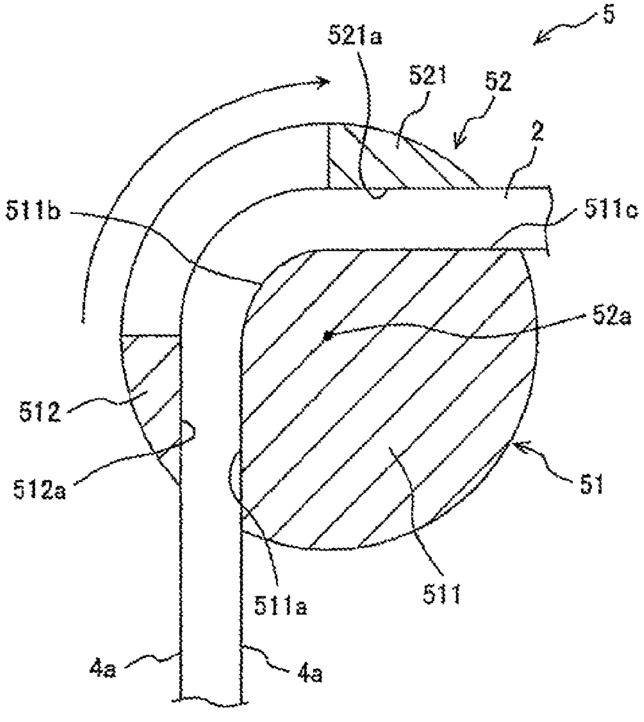

FIGS. 5A and 5B are schematic cross sectional views showing a state during an edgewise bending process of the rectangular enamel coated wire using the bending apparatus. FIG. 5A shows a state before the edgewise bending process and FIG. 5B shows a state after the edgewise bending process.

As shown in FIGS. 4A to 5B, the bending apparatus 5 has a first holding jig 51 and a second holding jig 52. Illustrations of locking mechanism and rotating mechanism of the holding jigs are omitted. The first holding jig 51 is provided with a first protruding portion 511 and a second protruding portion 512. The first protruding portion 511 has a continuous side surface composed of a first flat surface 511*a*, an arc surface 511*b* and a second flat surface 511*c*. The second protruding portion 512 has a flat surface 512*a* which is a side surface facing the first flat surface 511*a* of the first protruding portion 511. The rectangular enamel coated wire 2 is inserted and sandwiched between the first protruding portion 511 and the second protruding portion 512 so that the edge surfaces 4*a* of the rectangular enamel coated wire 2 respectively come into contact with the first flat surface 511*a* of the first protruding portion 511 and the flat surface 512*a* of the second protruding portion 512. An upper surface 510 of the first protruding portion 511 serves as a contact/sliding surface with respect to the second holding jig 52.

The second holding jig 52 is provided with a third protruding portion 521 having a flat surface 521*a* as a side surface. When the first holding jig 51 is combined with the second holding jig 52, the flat surface 521*a* of the third protruding portion 521 comes into contact with the edge surface 4*a* of the rectangular enamel coated wire 2 and a base surface 520 excluding the third protruding portion 521 serves as a contact/sliding surface with respect to the upper surface 510 of the first protruding portion 511 of the first holding jig 51.

The edgewise bending process is performed on the rectangular enamel coated wire 2, such that the first holding jig 51 and the second holding jig 52 are combined with the rectangular enamel coated wire 2 sandwiched therebetween and are relatively rotated around a rotation axis 52*a*. The rectangular enamel coated wire 2 is bent edgewise so as to have shape and angle along the side surface (the first flat surface 511*a*, the arc surface 511*b* and the second flat surface 511*c*) of the first protruding portion 511 of the first holding jig 51.

(3) Step of Cutting the Rectangular Enamel Coated Wire

Figure 6:
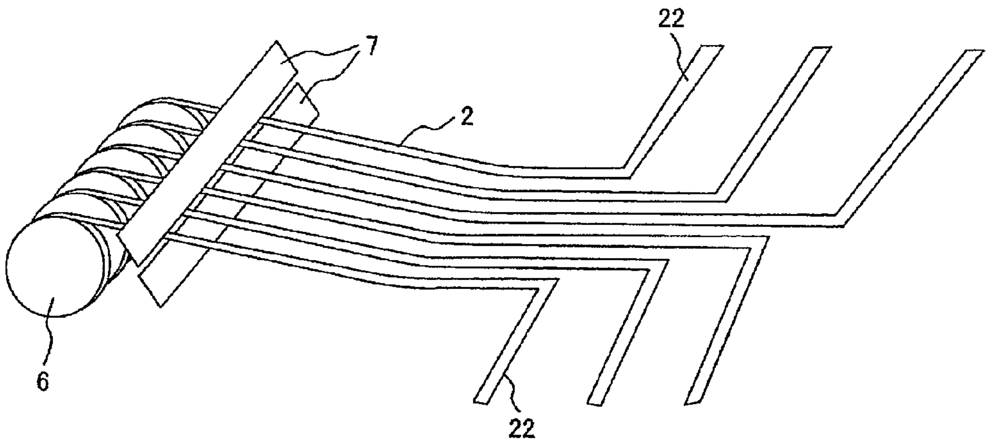
FIG. 6 is a schematic perspective view showing a state when the rectangular enamel coated wires each having the wiring branch portion are cut into a predetermined length.

FIG. 6 is a schematic perspective view showing a state when the rectangular enamel coated wires each having the wiring branch portion are cut into a predetermined length. As shown in FIG. 6, the rectangular enamel coated wires 2 each having the wiring branch portion 22 are cut at a predetermined position by a cutter 7. The predetermined position here means a position providing a predetermined length of the wiring stem portion.

Note that, although plural rectangular enamel coated wires 2 each having the wiring branch portion 22 are aligned and cut all together in FIG. 6 for the purpose of making clear the whole picture of the flat wiring member, the invention is not limited thereto. The rectangular enamel coated wires 2 may be cut one by one.

In addition, although it has been described that "the step of cutting the rectangular enamel coated wire" is performed after "the step of forming the wiring branch portion", "the step of forming the wiring branch portion" may be performed after "the step of cutting the rectangular enamel coated wire".

(4) Step of Forming the Wiring Stem Portion

Figure 7:
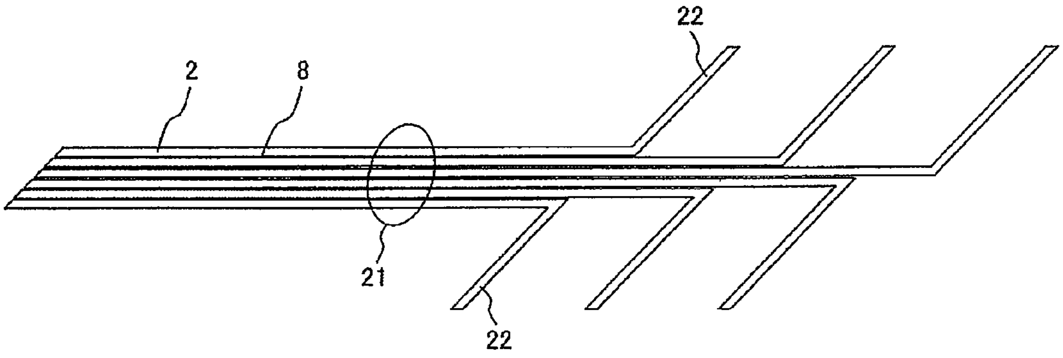
FIG. 7 is a schematic perspective view showing a state when the rectangular enamel coated wires each having the wiring branch portion and cut into a predetermined length are aligned to form a wiring stem portion.

FIG. 7 is a schematic perspective view showing a state when the rectangular enamel coated wires each having the wiring branch portion and cut into a predetermined length are aligned to form a wiring stem portion. As shown in FIG. 7, plural rectangular enamel coated wires 2 each having the wiring branch portion 22 and cut into a predetermined length are arranged in the form of a flat plate with end portions aligned on one side so that portions other than the wiring branch portions 22 are in parallel and the edge surfaces of the adjacent rectangular enamel coated wires 2 are adhered to each other, thereby forming the wiring stem portion 21.

The method of adhering the edge surfaces of the adjacent rectangular enamel coated wires 2 is not particularly limited and it is possible to use a conventional method. For example, an adhesive 8 may be used for adhesion.

In addition, preferably, a self-fusing insulated wire having a self-fusing layer 4.5 provided on the surface of the enamel coat layer 4 (i.e., provided as the outermost layer) is used as the rectangular enamel coated wire 2. In this case, the plural aligned and adhered rectangular enamel coated wires 2 are treated with heat or a solvent to cause the self-fusing layers to be joined to each other and the wiring stem portion 21 is thereby formed.

In case that the self-fusing insulated wires are adhered by heat treatment, processing strain remaining in the conductor 3 of the rectangular enamel coated wire 2 can be relaxed by such heat treatment. As a result, heat treatment for strain relaxation separately performed to improve flexibility of the flat wiring member can be eliminated, thereby contributing to reduction of the manufacturing cost.

(5) Step of Processing the Terminal Portion

Next, the terminal portion 21*a* of the wiring stem portion 21 and/or the terminal portions 22*a* of the wiring branch portions 22 are processed so as to allow connection to a control circuit, a protection circuit and electrodes of respective cells of the secondary battery module. As a result, the flat wiring member 1 as shown in FIGS. 1A to 1D is finished. It should be noted that, the structure of the terminal portion is not limited to that shown in FIGS. 1A to 1D and a structure suitable for a method of connecting to a connection target is selected.

Second Embodiment

Flat Wiring Member

Figure 8:
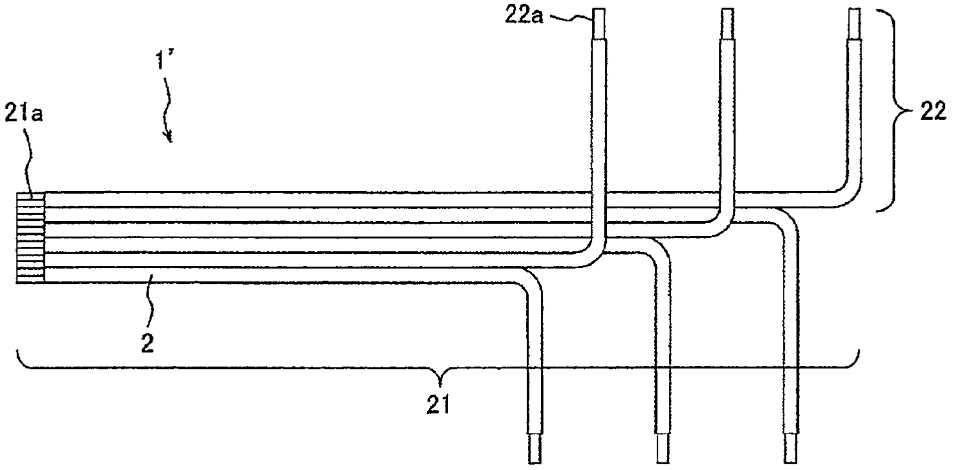
FIG. 8 is a schematic front view showing an example of a flat wiring member in a second embodiment.

FIG. 8 is a schematic front view showing an example of a flat wiring member in the second embodiment. As shown in FIG. 8, a flat wiring member 1' in the second embodiment is different from the first embodiment in that the wiring branch portions 22 extend over the wiring stem portion 21.

In the flat wiring member of the invention, each conductive wire is an enamel coated wire and electrical insulation between the conductive wires is thus ensured. Therefore, electrical short circuit does not occur even when the wiring stem portion 21 intersects with the wiring branch portions 22 as is in the flat wiring member 1'. Furthermore, since the rectangular enamel coated wire 2 is used as the conductive wire, an increase in a thickness at a crossover point is the minimum.

The flat wiring member 1' demonstrates that branching position and direction of the wiring branch portion 22 from the wiring stem portion 21 can be arbitrarily determined. In other words, the flat wiring member in the invention is advantageous in that the degree of freedom in designing the wiring branch portion 22 is very high. For example, even when the sequence of electrodes of cells to be monitored is restricted due to wiring efficiency of the control circuit or the protection circuit of the secondary battery module, it is possible to easily address such a problem. This leads to reduction in design cost required for specification change, thereby contributing to the cost reduction.

Note that, although the flat wiring member in the invention is desirably configured such that plural rectangular enamel coated wires 2 are arranged in the form of a flat plate at the wiring stem portion 21 from the viewpoint of flexibility, it does not means that the wiring branch portion 22 is prevented from branching (being bent) in a direction off from such a plane (e.g., in a normal direction). In addition, the number of bent portions on each wiring branch portion 22 is not limited to one.

The embodiments and examples are specifically described to help understanding of the invention and the invention is not limited to those having all configurations described herein. For example, configuration of an embodiment can be partially substituted with configuration of another embodiment or can be combined with configuration of another embodiment. Furthermore, a portion of configuration of each embodiment can be deleted, substituted with another configuration or combined with another configuration.

What is claimed is:

1. A flat wiring member, comprising: a plurality of rectangular enamel coated wires each including a respective enamel coating layer including flat surfaces and edge surfaces, and a respective self-fusing layer formed over the flat surfaces and the edge surfaces of the respective enamel coating layer, the plurality of rectangular enamel coated wires being arranged in the form of a flat plate; a fused wiring stem portion, with the plurality of rectangular enamel coated wires arranged parallel to each other and with the self-fusing layers over the edge surfaces of the enamel coating layers of adjacent rectangular enamel coated wires fused and bonded together; and an edgewise bent wiring branch portion with the rectangular enamel coated wires each bent edgewise so as to branch off from the wiring stem portion, wherein each of the plurality of rectangular enamel coated wires is continuously fused to an adjacent rectangular enamel coated wire until it branches off from the wiring stem portion, wherein each of the plurality of rectangular enamel coated wires includes, at a terminal portion of the wiring stem portion, a portion in which the enamel coating layers are partially removed such that the wires are exposed from the enamel coat layers, and wherein the flat wiring member further includes a reinforcing plate that contacts and is attached to the enamel coat layer on a rear side of the wire-exposed portions of each of the rectangular coated wires.

2. The flat wiring member according to claim 1, further comprising a connector terminal provided at a terminal portion of the wiring stem portion.

* * * * *